United States Patent [19]
Dehne

[11] Patent Number: 5,536,287
[45] Date of Patent: Jul. 16, 1996

[54] PARTICULATE COLLECTOR ASSEMBLY

[76] Inventor: Manfred F. Dehne, Uferstrasse 41, D-88149 Nonnenhorn, Germany

[21] Appl. No.: 399,447

[22] Filed: Mar. 7, 1995

[51] Int. Cl.⁶ .................................................. B01D 45/00
[52] U.S. Cl. ................... 55/346; 55/349; 55/466; 95/271
[58] Field of Search .................... 55/346, 347, 348, 55/349, 459.1, 466; 95/271

[56] References Cited

U.S. PATENT DOCUMENTS

| | | | |
|---|---|---|---|
| 1,333,325 | 3/1920 | McGee | 55/348 |
| 2,553,175 | 5/1951 | Davenport et al. | 55/348 |
| 3,415,374 | 12/1968 | Wikdahl | 55/349 |
| 3,802,570 | 4/1974 | Dehne | 55/459.1 |
| 4,285,706 | 8/1981 | Dehne | 55/349 |
| 4,348,215 | 9/1982 | Dehne | 55/466 |
| 4,398,932 | 8/1983 | Dehne | 55/349 |
| 5,122,171 | 6/1992 | Kalen et al. | 55/346 |
| 5,178,648 | 1/1993 | Kalen et al. | 55/349 |

*Primary Examiner*—C. Scott Bushey
*Attorney, Agent, or Firm*—Browning, Bushman, Anderson & Brookhart

[57] ABSTRACT

The particulate collector assembly 10 removes solid particulates from a gas stream. The assembly 10 includes an outer housing 12, an intermediate housing 40, and interior housing 54 to form therebetween a clean gas chamber 14, a particulate-laden gas chamber 41, and a particulate chamber. A plurality of cyclone separator units 62 cooperate with the chambers to remove particulates from the gas stream. Each separator unit is fixedly secured to the intermediate housing and extends radially inward through the inner housing 54. A plurality of cyclone supports 82 are secured to a radially inward end of the cyclone housings and are also secured to a center support pipe 90 within the particulate chamber. This arrangement forms a wagon wheel-like structure which provides the desired rigidity to prevent sagging of the cyclone separator units yet allows the assembly components to expand freely and uniformly to minimize stresses to avoid distortions when exposed to high operating temperatures.

15 Claims, 2 Drawing Sheets

PARTICULATE COLLECTOR ASSEMBLY

FIELD OF THE INVENTION

The present invention relates to equipment and techniques for separating solid particulates from gasses. Particularly, this invention relates to an improved solids particulate collector assembly suitable for receiving high temperature gasses such as those customarily encountered in fluid catalytic cracking processes.

DESCRIPTION OF PRIOR ART

Collectors for the removal of solid particulates from high temperature gas streams are useful in many industrial applications. Collector assemblies are commonly used for removing particulates from gas streams discharged from power generators, and from gas streams from catalytic cracking equipment used for the production of petroleum products. Those skilled in the art have long recognized that such collector assemblies are subject to high stresses which damage internal collector components, particularly when the collector and/or the industrial equipment connected thereto are restarted after being periodically shut down for maintenance or repair operations. Accordingly, a significant disadvantage of prior art particulate collector assemblies relates to a reduced life of the equipment in response to high stresses resulting from thermal expansion and contraction of collector assembly components during shut down and restarting operations.

U.S. Pat. No. 4,285,706 discloses a multiple cyclone separator system for receiving particulate-laden gas at a high temperature and a high pressure. Particulates are removed from the system with a plurality of cyclone separator units each supported within the collector assembly. The collector assembly includes a particulate-laden gas chamber, a particulate chamber and a clean gas chamber each mounted within a main vessel housing. The structural relationship between the various chambers and the individual cyclone separators is such that the individual separator units each have inlets in the particulate-laden gas chamber and outlets in fluid communication with both the particulate chamber and the clean gas chamber. During normal, undisturbed operating processes, the incoming solids loading of the gasses remains substantially constant. The concentration of solids in the transport gas thus remains substantially constant, and all transported solids will enter and be passed through the cyclone separators unit. U.S. Pat. Nos. 1,333,325 and 2,553,175 disclose separator systems which allow for periodic removal of particulate, although the separator systems disclosed in these patents are substantially dissimilar and are less favored than the system disclosed in U.S. Pat. No. 4,285,706.

U.S. Pat. No. 4,398,932 discloses a particulate separation system wherein excess solids generated during disturbed operating processes which result in solids surges may be passed from a particulate-laden gas chamber to a main housing particulate outlet without having first to pass through individual cyclone separator units. The particulate matter entering any of the individual cyclone separator units and being separated therein from the gas stream (the "fines") are subsequently discharged from the system together with excess particulate matter (the "debris") which does not enter any of the individual cyclone separators. U.S. Pat. No. 4,348,215 discloses a separation system including a particulate transfer support mechanism adjacent the bottom of a particulate-laden gas structure to transfer and keep separated excess particulate from the particulate-laden gas chamber outwardly of the main vessel housing prior to separation by individual cyclone separator units. The transfer support mechanism includes a vertical expansion member having a pair of expansion joints to substantially reduce or eliminate forces which otherwise would cause destructive expansion and contraction of assembly components.

While the above patents have advanced both the efficiency and the practical use of particulate collector assemblies of the type including a plurality of individual cyclone separator units, further improvements to such collector assemblies are necessary to increase the useful life, to lower initial costs, and to reduce the maintenance and replacement costs of the individual cyclone units within the collector assembly. As previously noted, collector system initial and maintenance costs have been particularly acute when the collector assembly receives high temperature gasses such as those output from catalytic cracking processes.

The disadvantages of the prior art are overcome by the present invention, and an improved collector assembly is hereinafter disclosed which achieves high particulate removal efficiency, is capable of reliable operation when receiving high temperature gasses, has low initial costs, has relatively low maintenance costs and minimizes individual cyclone separator unit replacement costs. The disadvantages of the prior art are accordingly overcome by the present invention, which provides a relatively low cost, high efficiency collector system capable of operating at relatively high temperatures.

SUMMARY OF THE INVENTION

A particulate collector assembly includes a main vessel housing forming a main housing chamber, a particulate-laden gas inlet to a particulate-laden gas chamber, a clean gas outlet from a clean gas chamber, and a particulate outlet from a particulate chamber. The generally cylindrical particulate-laden gas chamber is mounted substantially longitudinally within the main housing, while the generally annular clean gas chamber is mounted around the particulate-laden gas chamber. The collector assembly includes a plurality of individual cyclone separator units each having an inlet in fluid communication with particulate-laden gas chamber, a gas outlet in fluid communication with the clean gas chamber, and a particulate outlet in communication with the particulate chamber. Individual cyclone separator units may be circumferentially arranged in a vertically stacked arrangement.

Each cyclone separator unit has a generally cylindrical configuration and is sized for obtaining the desired high particulate removal efficiency. Each of the individual cyclone separator units may be mounted in a grid-like construction which permits the free radial and axial expansion of the individual cyclone separator units with respect to the main housing chamber, so that thermal expansion of each cyclone unit substantially reduces or eliminates stress build up within the collector assembly, thereby significantly increasing the useful life and reliability of the collector system. The technique for mounting each of the individual cyclone separator units within the main housing facilitates the easy replacement of a selected one or all of the individual cyclone units.

It is an object of the present invention to provide an improved particulate collector assembly which mounts individual cyclone selector units within the main vessel housing in a manner which substantially reduces or eliminates high thermal stresses on the individual cyclone separators units, thereby extending the life of the assembly. It is a related object of the present invention to provide an improved collector assembly having a comparatively long life when receiving high temperature gas streams containing particulate, thereby effectively reducing the cost of particulate removal.

It is a feature of the present invention that the improved collector assembly has a relatively low cost since the individual cyclone separator units have a high efficiency and have a relatively low unit cost. Individual cyclone separator units may also be easily replaced. Individual cyclone separators are not arranged in a system where ducting to and from each cyclone separator unit is required. A related feature of the present invention is that the assembly has low maintenance costs even when operating over a broad range of temperatures, since the stress on assembly components is minimized.

An advantage of the present invention is that the collector assembly is ideally suited for receiving contaminated gas streams from fluid catalytic cracking operations. The collector assembly of this invention may replace complicated and high maintenance systems with external cyclone collectors having individualized inlet and outlet ducting.

These and further objects, features and advantages of the present invention will become apparent from the following detailed description of the invention, wherein reference is made to the figures in the accompanying drawings.

DETAILED DESCRIPTION OF PREFERRED EMBODIMENTS

Figure 1:
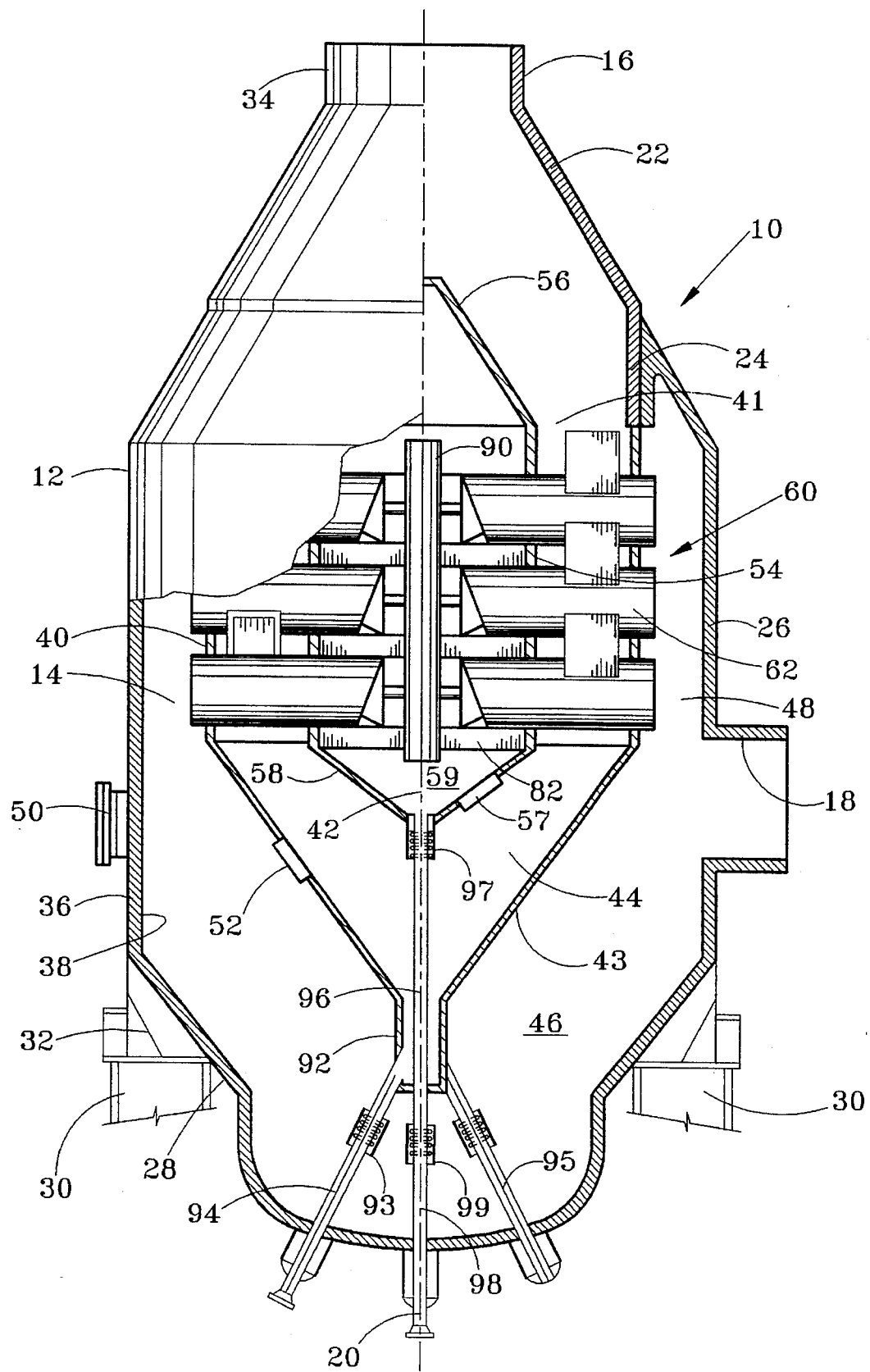
FIG. 1 is a side view, partially in cross section, of an improved particulate collector assembly according to the present invention.

FIG. 1 illustrates a side view in partial cross section of the improved particulate filtration device or collector assembly 10 of the present invention, including a generally cylindrical main vessel housing 12 forming a main housing chamber 14. The main vessel housing 12 has a particulate-laden gas inlet 16 adapted to receive particulate-laden gas, a clean gas outlet 18 to transfer cleaned gas outwardly of the main vessel housing, and a particulate outlet 20 to transfer particulate of a relatively small size (the "fines") outwardly of the main vessel housing, and a particulate outlet 94 to transfer excess particulates of relatively larger size ("the debris") outwardly of the main vessel housing.

The main vessel housing 12 is formed with a substantially frustoconical top portion 22, a cylindrical entry portion 24, a generally cylindrical main body portion 26, and a generally inverted frustoconical bottom portion 28. The cylindrical portion 24 defines a central collector axis 42. The main housing 12 is typically supported on beam legs 30 extending downward from vessel support skirts 32. The particulate-laden gas inlet 16 has a cylindrical wall 34 adapted to be connected to a source of particulate-laden gas, such as the gas output from a fluid catalytic cracking operation. At the option of the user, the cleaned gas from outlet 18 may be discharged to the environment, returned to the equipment generating the contaminated gas, or passed to subsequent process equipment.

The main vessel housing 12 and the other structures of this invention may be constructed of material suitable for a high-temperature, high-pressure environment. The outer surface 36 of main vessel housing 12 may be formed of individual plates welded together. The inner surface 38 of main vessel housing 12 may be covered by a thermal insulation material suitable to resist high temperatures.

The particulate-laden gas inlet 16 supplies gas to a generally cylindrical particulate-laden gas chamber 41 formed by the main housing vessel 12 and particulate collector housing 40. Housing 40 has a frustoconical lower portion 43 which defines a debris collection plenum or debris chamber 44 therein. An inverted, substantially frustoconical upper housing portion 56 together with a cylindrical housing portion 54 and another frustoconical portion 58 define the internal particulate collection chamber 59. The inverted, substantially frustoconical housing portion 56 diverts gas toward the individual cyclone separator units 62. Both the housing 40 and lower plenum 43 are centered substantially longitudinally with regard to central collector axis 42 of the main vessel housing 12. Also, the inner housing portion 54 has an axis substantially coaxial with the central axis 42.

A generally annular clean gas chamber 48 is formed between particulate-laden gas housing 40 and the main vessel housing 12. The longitudinal axis of the clean gas chamber 48 substantially coincides with the main vessel housing axis 42. The clean gas chamber 48 is in fluid communication with clean gas outlet 18 and includes a clean gas discharge plenum 46 formed in the frustoconical annulus between portions 28 and 43. Operator access to the clean gas chamber 48 may obtained with access hatch 50, and access from chamber 48 to the debris collector plenum 44 may be obtained via one or more similar access hatches or plates 52. Access to plenum 59 from plenum 44 may be had through access plate 57.

Separation of particulate from the particulate-laden gas is performed by cyclone separator assembly 60 which includes a plurality of individual cyclone separator units 62, which optionally may be of the type disclosed in U.S. Pat. No. 3,802,570. Separator unit efficiency is inversely proportional to the nominal diameter of the unit, so that a large number of small diameter collector units have a higher efficiency than a small number of large diameter units. On the other hand, an increase in the number of cyclone separators increases the cost of the collector assembly. Each separator unit 62 is supported within the main housing chamber 14 by the particulate-laden gas housing 40, as explained below.

Figure 2:
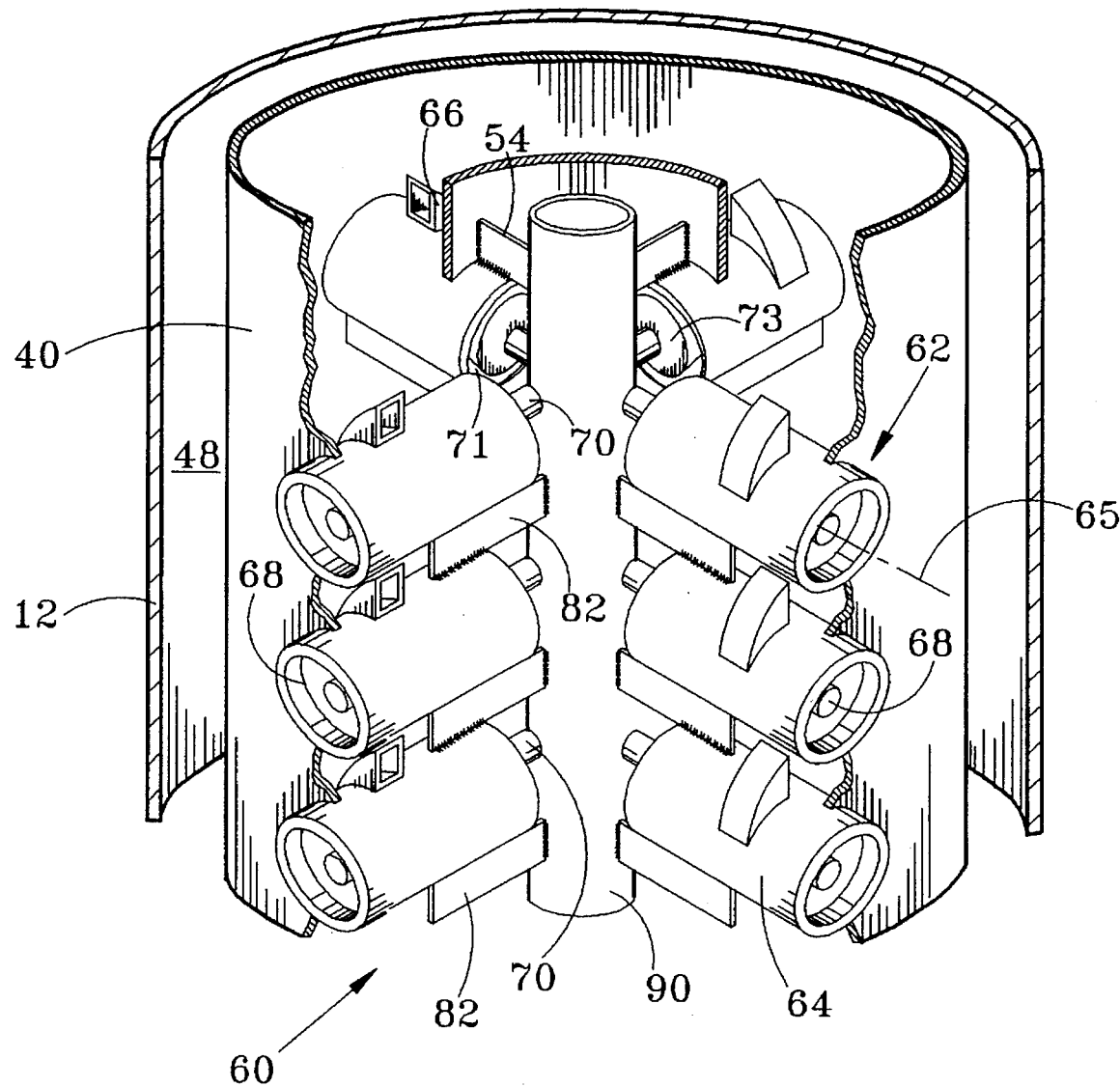
FIG. 2 is a pictorial view, partially in cross section, illustrating the mounting of the individual cyclone separator units within the collector assembly as shown in FIG. 1.

As shown in FIG. 2, a typical separator unit 62 has a main cylindrical body 64 having a horizontal axis 65 perpendicular to and preferably passing through or closely adjacent vertical axis 42 (see FIG. 1 ), a particulate-laden gas inlet 66, a clean gas outlet 68 and a particulate outlet 71. A horizontal rod 70 extending radially outward from central connector pipe 90 supports a cone-shaped member 73 of a collector unit 62. The particulate outlet 71 is thus defined by the annulus between the housing 64 and the inner cone-shaped member 73. Each separator unit has its cylindrical body 64 fixedly connected to the housing 40 at a circular openings formed in particulate-laden gas housing 40. The clean gas outlet 68 from each unit 62 is thus in fluid communication with the clean gas chamber 48, and the particulate outlet 71 of each unit 62 is in communication with the particulate collection plenum 59. Particulate-laden gas within particulate-laden gas chamber 4 1 enters each separator unit main body 64 through the particulate-laden gas inlet 66, and is swirled towards the particulate outlet 71. The separator units 62 thus substantially separate the entering mixture into cleaned gas and particulate. The particulate exits through the particulate outlet 71 into particulate housing chamber 59. The cleaned gas exits through the clean gas outlet 68 into clean gas chamber 48 and flows outwardly of the housing 12 via outlet 18. A pressure differential exists between the inlet 66 and outlets 68 and 71 of each separator unit. Those skilled in the art will appreciate that the individual separator units are shown in FIG. 2 with little detail, since the particulars of the cyclone separator unit are not critical to the invention.

Referring to FIG. 2, each level of cyclone collector unit assemblies incorporates four individual cyclone units equally spaced around a central connector pipe 90. The number of cyclone collectors in each level may be varied as required. A cyclone support or beam plate 82 is fixedly attached to a cyclone unit at both the upper and lower side of its housing 64. Each connector beam plate 82 is also welded to central support or pipe 90, which may have any desired cross-sectional configuration suitable for fixedly securing the radially inward ends of the plurality of plates 82. The central support pipe 90 also has a central support member axis substantially coaxial with collector axis 42. It is important that the intermediate housing axis, the inner housing axis, and the central support member axis be substantially coaxial. The outermost edge of the individual connector beam plate 82 is attached by welding to particulate chamber housing 54. With the exception of the uppermost and lowermost level of cyclone units, the vertically spaced cyclone units may share a connector beam plate, i.e., the upper edge of a beam plate is fixed to the lower side of one housing 64, while the lower side of the same beam plate is fixed to the upper side of the housing below that beam plate. Connector beam plates 82 thus serve as spacer plates between vertically stacked cyclone units. The uppermost and lowermost cyclone units will also receive a connector beam plate as well, although this plate may differ in height dimensions as compared to the spacer plates utilized to connect other cyclone units arranged within the cluster of the separator assembly 60.

This arrangement of cyclone collector units as shown in FIG. 2 resembles a "wagon-wheel-like" structure, and this design may be compared to a wagon wheel fitted with a plurality of spokes. The individual cyclone units and the connector beam plates are thus analogous to spokes, the central connector pipe 90 is analogous to a hub, and the cylindrical housing 40 is analogous to the rim of the wagon wheel. Each individual spoke is supported where the spoke attaches to both the rim of the wagon wheel and to the hub, i.e., each individual cyclone unit is welded to internal vessel housing 40, and a pair of plates each rigidly welded to the housing 64 of each cyclone separator unit 62 are welded to central connector pipe 90. The housings 64 and the beam plates 82 together form the radially projecting spokes each extending between support pipe 90 and housing 40. Each of the plate-like members 82 is fixed in a plane substantially parallel to and inclusive of the central axis 42 of the assembly 10, which is coaxial with the central axis of the support pipe 90. Such an assembly is quite stiff, yet flexible in that it may expand freely and uniformly in radial as well as axial directions without exerting high stresses upon its individual components. In addition, this design retains the geometry of each cyclone separator unit, thus avoiding distortions when exposed to high operating temperatures. Constant performance results are thereafter delivered, and separation efficiency will not suffer.

A cluster of cyclone units shown in FIG. 2 are assembled and vertically stacked inside vertical vessel housing 40. The cluster of cyclone units comprising assembly 60 as shown in FIG. 1 is thus composed of a number of "wagon-wheel-like" subassemblies firmly welded together. Housing portion 54 and upper and lower portions 56 and 58 are thus supported by the "wagon-wheel-like" cluster of cyclones 60, which in turn are supported by vessel ho subassembly "hangs" inside main housing chamber 14. As a result, every component may now expand and/or contract individually, radially as well as axially, without exerting large stresses upon adjacent components. Because of this wagon wheel arrangement and the strength provided by beam plates 82 and central support pipe 90, the radially inward ends of the cyclone housings 64 do not sag or bend downward, and the central axis 65 of each cyclone collector 62 remains horizontal. This wagon wheel arrangement also allows the size of the cyclone units 62 to be increased (thereby reducing the overall cost of the collector assembly), while also providing increased support between assembly components so that the collector assembly 60 is adequately supported and the efficiency of each collector is maintained.

Components 56, 54 and 58 as shown in FIG. 1 define particulate chamber 59 where the "fines" will accumulate. Larger debris is caught in debris chamber 44. Discharge outlet 92 is in fluid communication with debris chamber 44. The content of debris chamber 44 thus empties into debris discharge outlet 92 and from there is discharged from the entire assembly by debris discharge pipe 94. Pipe 94 is fitted with an expansion element 93 in order to compensate for differences in axial expansion between main vessel housing 12 and the internal cluster of components primarily housed within debris chamber 44. The outer main vessel 12 is relatively cold and usually is formed from carbon steel, while the relatively hot internal components are preferably formed from stainless steel. To compensate for stresses caused by thermally induced movements of the various components involved, a "dummy" leg 95 is provided at the opposite side of leg 94 with respect to the geometric central axis 42 of the vessel housing. Leg 95 is a mirror image of debris discharge pipe 94 and is identical in design and materials. Leg 95 may or may not be in fluid communication with debris chamber 44, although preferably it is not. U.S. Pat. No 4,348,215 discloses further information with respect to this dummy leg.

Referring still to FIG. 1, the "fines" discharge pipe 98 has a lower end 20 exterior of the main vessel housing 12 and provided with particulate discharge flange 20 which is in fluid communication with particulate chamber 59. Separated particulate "fines" are continuously passed through pipe 98. In order to compensate for differences in axial expansion between housing 54 defining particulate chamber 59 and housings 40 and 43 defining debris chamber 44, pipe 96 which fluidly connects chamber 59 with pipe 98 is fitted with an expansion element 97 preferably provided at the discharge outlet of particulate chamber 59. Expansion element 97 may be provided, however, at any location within debris chamber 44.

In order to make up for differences in axial expansion between housings 40 and 43 and the main housing 12, pipe 98 is fitted with another expansion element 99 provided within chamber 46. Particulate discharge pipe 96 is accordingly in fluid communication with particulate chamber 59 and lower end 20 exterior of the main vessel housing. This discharge pipe assembly prevents fines separated by cyclone units 62 from fluid communication with either debris chamber 44 or clean gas chamber 46.

Particulate-laden gas enters at inlet 16 and progresses downwardly into the annulus formed between the particulate chamber housing 54 and debris chamber housing 40. All the gas proportionally flows into the individual cyclone units through their inlet openings 66. Any debris which does not enter into the inlet cyclone inlet openings 66 because of its greater size or mass will progress downwardly and will drop into debris chamber 44. From there, the debris particulates will continuously leave the assembly 10 via debris discharge pipe 94.

That portion of the particulates entering the individual cyclone units via inlet opening 66 will be separated and discharged from each individual cyclone unit 62 through an annulus opening defined by collector housing 64 and frustoconical insert 73. Separated particulate enters particulate chamber 59 and is discharged from vessel assembly 10 through particulate discharge pipe assembly 96 as explained above. Both debris and fines are discharged from the unit by gravitational force. No gas flow is required, although optionally some nominal gas flow could be provided. Cleaned gas is discharged from each individual cyclone unit 62 into cleaned gas chamber 46 via individual vortex finder tube 68 as shown in FIG. 2. Cleaned gas leaves assembly 10 via main discharge pipe 18.

According to the design as shown in U.S. Pat. No. 4,398,932, the relatively large number of cyclone collectors are each fixed to the tubular wall separating the particulate-laden gas chamber and particulate chamber, and support the radially inward cleaned gas housing within the collector. For the purposes of reliably supporting the clean gas housing, the unsupported total length of the relatively large number of small cyclone collectors becomes a function only of operating temperature. Accordingly, the central axis of each cyclone collector remains substantially horizontal during operation of the collector assembly, and high bending stresses are not imparted upon the cyclone collector housings.

According to the present invention, a plurality of individual cyclone collectors are utilized, although the number is relatively small compared to the design disclosed in U.S. Pat. No. 4,398,932. The size of the cyclone collectors is increased in pan to lower the overall cost of the assembly. The larger size and weight of each collector, coupled with the longer lever arm created by the radially spaced housings within the collector assembly, increases the tendency of each cyclone unit to sag, particularly when the collector assembly is operating at temperatures in excess of 600° F. If the radially inward portion of each cyclone unit 62 sags, the horizontal axis 65 of each cyclone unit slopes downward, which adversely effects the performance of the unit. Moreover, this sagging weakens the mechanical connections which must sealingly hold each collector unit 62 in place, thereby increasing maintenance cost for the reliable operation of the collector assembly.

The desired material for the assembly housings 40 and 54 may differ from the material for the cyclone unit housing 64, so that different components of the overall assembly thus also have different expansion rates. This longitudinal expansion of the collector unit also creates high stresses which tend to reduce the effective life of the assembly. If the generally cylindrical outer housing 64 of each cyclone unit 62 is only welded to the radially spaced housings 40 and 54, the longitudinal expansion of each cyclone unit in response to temperature variations (expansion along the horizontal axis 65 of each cyclone unit which is perpendicular to the vertical axis 42 of the assembly) also imparts significant stresses on these connections. Because of the very "stiff" cluster of modular collector assembly according to the design of this invention, sagging of individual cyclones is avoided. As a result, the high bending stresses acting upon the fixed connection between the collector housing 64 and the vessel housing 40 are avoided. The resulting membrane stresses are quite low in comparison.

In addition to providing support for each of the collector units 62 and eliminating the stresses between the housings 40 and 54, the support structure provided by beam support plates 82 also contributes to the ease of replacing individual cyclone units. By breaking the connections between the rod 70 and the central connector pipe 90, the beam plates 82 and the collector housing 64, and also between the collector housing 64 and the housing 40, any cyclone collector unit 62 may be easily replaced. A new or a repaired cyclone unit may then be positioned between the respective beam plates 82, and the assembly then secured in place by rewelding the rod 70 to the central connector pipe 90 and similarly interconnecting the cyclone unit housing 64 with the housing 40 and the pair of plates 82.

If an even number of collector units 62 are provided in each level of the collector assembly 60, each unit is spaced radially opposite another of the collector units 62 within that level. The individual separator units 62 of the separator assembly 60 preferably are circumferentially mounted in a vertical stacked arrangement, as shown in FIG. 1. If desired, the separator units could be arranged in a spiralling arrangement.

The foregoing disclosure and description of the invention are illustrative and explanatory thereof and various changes in the size, shape and materials as well as the details of the illustrated construction may be made without departing from the spirit of the invention.

What is claimed is:

1. A particulate collector assembly for removing solid particulates from a gas stream, the assembly comprising:

an outer housing including a gas inlet for receiving particulate-laden gas and a gas outlet for discharging clean gas;

an intermediate housing supported within the outer housing, the intermediate housing and the outer housing defining a clean gas chamber therebetween in fluid communication with the gas outlet;

an inner housing supported within the intermediate housing, the inner housing and intermediate housing defining a particulate-laden gas chamber therebetween in fluid communication with the gas inlet;

the inner housing defining a particulate chamber therein for receiving separated particulates;

a plurality of cyclone separator units each having a cyclone unit inlet in fluid communication with the particulate-laden gas chamber, a cyclone unit outlet in fluid communication with the clean gas chamber, and a particulate outlet in fluid communication with the particulate chamber;

a central support member within the particulate chamber;

the plurality of cyclone separator units arranged circumferentially about the central support member, each cyclone separator unit including a cyclone housing and a cone member within the cyclone housing; a radially outward portion of each cyclone housing being fixedly secured to the intermediate housing and each cyclone housing extending radially inward through the inner housing; and a plurality of radially projecting cyclone supports each fixedly secured to a radially inward end of a respective cyclone housing and fixedly secured to the central support member, the plurality of cyclone supports and the central support member cooperatively supporting the radially inward end of the plurality of cyclone separator units.

2. The assembly as defined in claim 1, wherein each of the plurality of cyclone supports is a plate member fixed in a plane substantially parallel to a central axis of the central support member.

3. The assembly as defined in claim 2, wherein the plurality of cyclone separator units are positioned within the outer housing in a plurality of levels, and the plurality of cyclone separator units are arranged at substantially equal angular intervals about the central support member.

4. The assembly as defined in claim 1, wherein a plurality of cyclone separator units are arranged within the outer housing in a plurality of levels, and a plurality of cyclone support members include spacer plates each fixedly secured to a lower side of an upper cyclone housing and to an upper side of a lower cyclone housing.

5. The assembly as defined in claim 1, further comprising:
a plurality of connecting supports each fixedly secured to the central support member and supporting a respective cone member within a respective cyclone housing.

6. The apparatus as defined in claim 1, further comprising:
a particulate discharge pipe for discharging particulate from the particulate chamber outward of the outer housing.

7. The assembly as defined in claim 6, further comprising:
a debris discharge pipe for discharging debris from the particulate-laden gas chamber outward from the outer housing.

8. A particulate collector assembly for removing solid particulates from a gas stream, the assembly comprising:
an outer housing including a gas inlet for receiving particulate-laden gas and a gas outlet for discharging clean gas;

an intermediate housing supported within the outer housing, the intermediate housing having a cylindrical portion defining an intermediate axis, the intermediate housing and the outer housing defining a clean gas chamber therebetween in fluid communication with the gas outlet;

an inner housing supported within the intermediate housing, the inner housing and intermediate housing defining a particulate-laden gas chamber therebetween in fluid communication with the gas inlet;

the inner housing defining a particulate chamber therein for receiving separated particulates;

a plurality of cyclone separator units each having a cyclone unit inlet in fluid communication with the particulate-laden gas chamber, a cyclone unit outlet in fluid communication with the clean gas chamber, and a particulate outlet in fluid communication with the particulate chamber;

a central support member within the particulate chamber, the central support member having a support member axis substantially coaxial with the intermediate housing axis;

the plurality of cyclone separator units arranged circumferentially about the central support member, each cyclone separator unit including a cyclone housing and a cone member within the cyclone housing;

a radially outward portion of each cyclone housing being fixedly secured to the intermediate housing and each cyclone housing extending radially inward through the inner housing; and a plurality of cyclone supports each fixedly secured to a radially inward end of a respective cyclone housing and fixedly secured to the central support member.

9. The assembly as defined in claim 8, wherein the inner housing has a cylindrical portion having an inner housing axis substantially coaxial with the intermediate housing axis.

10. The assembly as defined in claim 8, wherein:
the outer housing has a cylindrical portion having an outer housing axis substantially coaxial with the intermediate housing axis.

11. The assembly as defined in claim 8, wherein a plurality of cyclone separator units are arranged within the outer housing in a plurality of levels, and a plurality of cyclone support members include spacer plates each fixedly secured to a lower side of an upper cyclone housing and to an upper side of a lower cyclone housing.

12. The assembly as defined in claim 8, further comprising:
a plurality of connector supports each fixedly secured to the central support member and supporting a respective cone member within a respective cyclone housing.

13. The assembly as defined in claim 8, wherein a radially outward end of each of the plurality of cyclone supports is fixedly attached to the inner housing.

14. The apparatus as defined in claim 8, further comprising:
a particulate discharge pipe for discharging particulate from the particulate chamber outward of the outer housing.

15. The assembly as defined in claim 8, further comprising:
a debris discharge pipe for discharging debris from the particulate-laden gas chamber outward from the outer housing.

* * * * *